United States Patent
Aloui et al.

(10) Patent No.: US 11,782,527 B2
(45) Date of Patent: Oct. 10, 2023

(54) SYSTEM FOR RECORDING A TRACK TRACED BY A UTENSIL OVER A WRITING SURFACE

(71) Applicants: ADVANCED MAGNETIC INTERACTION, AMI, Seyssinet-Pariset (FR); COMMISSARIAT À L'ENERGIE ATOMIQUE ET AUX ENERGIES ALTERNATIVES, Paris (FR)

(72) Inventors: Saifeddine Aloui, Grenoble (FR); Franck Vial, Grenoble (FR); Sebastien Brulais, Grenoble (FR); Laure Peris Y Saborit, Grenoble (FR); Jean-Marie Dupre La Tour, Saint-Martin-d'Heres (FR); Tristan Hautson, Saint-Martin-d'Heres (FR); Myrna Jaillet-Casillas, Saint-Martin-d'Heres (FR); Simon Thomas, Saint-Martin-d'Heres (FR)

(73) Assignees: ADVANCED MAGNETIC INTERACTION, AMI, Seyssinet-Pariset (FR); COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/765,524

(22) PCT Filed: Sep. 30, 2020

(86) PCT No.: PCT/EP2020/077402
§ 371 (c)(1),
(2) Date: Mar. 31, 2022

(87) PCT Pub. No.: WO2021/064041
PCT Pub. Date: Apr. 8, 2021

(65) Prior Publication Data
US 2022/0397967 A1    Dec. 15, 2022

(30) Foreign Application Priority Data
Oct. 4, 2019    (FR) .................... 19 11036

(51) Int. Cl.
*G06F 3/0354*    (2013.01)
*G06F 3/041*    (2006.01)
*G06F 3/046*    (2006.01)

(52) U.S. Cl.
CPC .......... *G06F 3/03545* (2013.01); *G06F 3/046* (2013.01); *G06F 3/04144* (2019.05); *G06F 3/04162* (2019.05); *G06F 2203/04106* (2013.01)

(58) Field of Classification Search
CPC ............ G06F 3/03545; G06F 3/04144; G06F 3/04162; G06F 3/046; G06F 2203/04106
See application file for complete search history.

(56) References Cited

U.S. PATENT DOCUMENTS

| | | | | |
|---|---|---|---|---|
| 2015/0057969 A1* | 2/2015 | Hautson | ............... | G06F 3/046 702/150 |
| 2015/0084915 A1* | 3/2015 | Hautson | ............... | G06F 3/046 345/174 |
| 2016/0018945 A1 | 1/2016 | Tran et al. | | |

FOREIGN PATENT DOCUMENTS

| | | | |
|---|---|---|---|
| EP | 2 662 756 A1 | 11/2013 | |
| FR | 2 988 872 A1 | 10/2013 | |

(Continued)

OTHER PUBLICATIONS

International Search Report dated Dec. 8, 2020 in PCT/EP2020/077402 filed Sep. 30, 2020, 2 pages.

*Primary Examiner* — Lisa S Landis
(74) *Attorney, Agent, or Firm* — Oblon, McClelland, Maier & Neustadt, L.L.P.

(57) ABSTRACT

The invention relates to a system for recording a track comprising: a utensil comprising a tip and equipped with a magnetic object; a device for locating the magnetic object configured to determine an estimated reference position on a writing surface; and a matrix-array touch sensor config- (Continued)

ured to define a set of M pixels, among N pixels, at least partially encircling the estimated reference position, and to detect the contact of the tip on the writing surface on the basis of the electrical signals generated by said set of M pixels.

11 Claims, 4 Drawing Sheets

(56) References Cited

FOREIGN PATENT DOCUMENTS

WO     WO 2013/057412 A1    4/2013
WO     WO 2018/219891 A1    12/2018

\* cited by examiner

SYSTEM FOR RECORDING A TRACK TRACED BY A UTENSIL OVER A WRITING SURFACE

TECHNICAL FIELD

The field of the invention is that of recording a track traced over a writing surface by the tip of a utensil manipulated by a user. The track corresponds to all of the successive positions of the tip when it is in contact with the writing surface.

PRIOR ART

Electronic systems for recording the track of the tip of a utensil over a writing surface—for example the tip of a stylus, of a pencil, inter alia—notably allow the drawing drawn or the writing written by a user manipulating the utensil to be digitized.

Generally, it is important to be able to detect with precision the contact of the tip of the utensil on the writing surface while avoiding or limiting the impact on the detection of parasitic contacts such as the contact of the thumb or that of the palm of the hand of the user. In this regard, document EP2811383A1 describes an example of a system for recording the track of a utensil over a writing medium by means of an array of magnetometers that allow the position of at least one magnet fastened to the utensil to be tracked. Such a system makes it possible to not take into account parasitic contacts.

To detect the contact and the pressure exerted by the tip on the writing surface, the utensil of this track-recording system comprises a first magnet fastened to the tip, which is retractable with respect to the body of the utensil, and a second magnet fastened to the body. The system determines the position and/or the orientation of the two magnets, deduces therefrom their relative separation, then detects the contact of the tip on the writing surface when this separation is smaller than a predefined threshold value. However, it is necessary here to use a particular utensil comprising at least two magnets, which are associated with each other mechanically. It is thus not possible to use any utensil.

Document WO2013/057412 describes another example of a system for recording the track of a utensil, here by means of a matrix-array touch sensor, which is for example of capacitive or resistive type. This matrix-array touch sensor comprises a matrix array of distinct pixels that are formed by the intersection of conductive lines placed in rows and columns on either side of a film. The contact of the tip of the utensil is detected on the basis of measurement of the amplitude of the electrical signals emitted by the pixels.

However, in such a system, a resolution associated with the measurement of the position of the contact of the tip notably depends on the dimensions and on the pitch of arrangement of the pixels. In addition, such a system has a certain latency because of the time required to read the pixels of the matrix array. In this document, to decrease this latency while optimizing power consumption, provision is made to perform a global column measurement and to measure rows sequentially only when a contact is detected on at least one of the activated columns. This requires suitable electronics allowing such a control of the activation of the pixels to be provided. There is therefore still a need to limit power consumption while decreasing the latency related to pixel read-out, without complexifying the electronics and connecting links required.

Moreover, document FR2988872A1 describes a display comprising a device for locating a movable magnetic object by means of an array of magnetometers.

SUMMARY OF THE INVENTION

The objective of the invention is to at least partially remedy the drawbacks of the prior art. To this end, one subject of the invention is a system for recording a track traced on a writing surface, comprising:
- a utensil, intended to be manipulated by a user, equipped with a magnetic object, and comprising a tip intended to make contact with the writing surface to form the track to be recorded;
- a locating device, comprising:
  - an array of magnetometers, which are secured to the writing surface, and configured to measure a magnetic field emitted by the magnetic object;
  - an electronic computing unit, configured to determine a state vector $X_a$ representative of at least the position of the magnetic object on the basis of the measured magnetic field, and to determine an estimated reference position $\hat{C}_{p|c}$ on the writing surface on the basis of the state vector $X_a$.

According to the invention, the system comprises a matrix-array touch sensor comprising:
- a matrix array of N distinct pixels, which are secured to the writing surface, and each configured to deliver an electrical response signal representative of a contact of the tip on the writing surface;
- an electronic processing unit, connected to the electronic computing unit, and configured to define a set $S_{px}$ of M pixels, with M lower than N, at least partially encircling said estimated reference position $\hat{C}_{p|c}$; to transmit an electrical command signal to the M pixels of said set $S_{px}$ and to receive their electrical response signals; and to detect the contact of the tip on the writing surface on the basis of the electrical response signals generated by said set $S_{px}$ of M pixels, and when contact is detected, to store the successive positions of the tip to form the record of the track at least depending on the successive estimated reference positions $\hat{C}_{p|c}$.

The following are certain preferred but non-limiting aspects of this system for recording the track of a utensil.

The locating device may be configured to determine a position $P_{p,z}$ of the tip along an axis orthogonal to the writing surface on the basis of the state vector $X_a$, to compare the determined position $P_{p,z}$ with a predefined threshold value $P_{p,z,th}$, and to transmit the estimated reference position $\hat{C}_{p|c}$ to the matrix-array touch sensor when the position $P_{p,z}$ is less than or equal to the predefined threshold value $P_{p,z,th}$.

The locating device may be configured to activate the matrix-array touch sensor when the position $P_{p,z}$ is less than or equal to the predefined threshold value $P_{p,z,th}$, the matrix-array touch sensor remaining turned off in the contrary case.

The estimated reference position $\hat{C}_{p|c}$ may be determined by projecting, along an axis orthogonal to the writing surface, the position $P_{p,xy}$ of the tip in a plane parallel to the writing surface.

The locating device may be configured to compute a velocity of the magnetic object on the basis of the state vector $X_a$ determined at a plurality of measurement times and to transmit the velocity to the processing unit, the latter being configured to define the set $S_{px}$ of M pixels with an outline elongate along a major axis, the major axis being parallel to the axis of the velocity. The major axis may have a length that depends on the norm of the velocity.

The matrix-array touch sensor may be a matrix-array pressure sensor configured to determine a pressing force exerted by the tip on the writing surface.

The matrix-array touch sensor may be configured to determine a position $C_{p|c}$ of the point of contact of the tip on the writing surface, the position of the tip stored to form the track depending on the reference estimated position $\hat{C}_{p|c}$ and on the position $C_{p|c}$ of the point of contact of the tip.

The state vector $X_a$ may be determined by a Bayesian-estimation algorithm or using an optimization method.

The invention also relates to a method for recording a track of the point of a utensil over a writing surface by means of the system according to any one of the preceding features, comprising the following steps:

- manipulation, by a user, of the utensil, the latter not making contact with the writing surface;
- measurement of a magnetic field emitted by the magnetic object at various successive measurement times $t_n$, by the matrix array of magnetometers;
- determination of the state vector $X_a(t_n)$ of the magnetic object, on the basis of the measurements of the measured magnetic field;
- determination of the estimated reference position $\hat{C}_{p|c}(t_n)$ on the writing surface, on the basis of the determined state vector $X_a(t_n)$;
- determination of a set $S_{px}(t_n)$ of N pixels $Px_i$ at least partially encircling the estimated reference position $\hat{C}_{p|c}(t_n)$;
- transmission of an electrical command signal to the pixels of the set $S_{px}(t_n)$, and reception of electrical response signals;
- detection of the contact of the tip on the writing surface, on the basis of the received electrical response signals, and storage of the successive positions of the tip to form the record of the track at least depending on the successive estimated reference positions $\hat{C}_{p|c}(t_n)$.

The invention also relates to a data-storage medium comprising instructions for executing a method for recording a track according to the preceding feature, when these instructions are executed by an electronic computing unit.

BRIEF DESCRIPTION OF THE DRAWINGS

Other aspects, aims, advantages and features of the invention will become more clearly apparent on reading the following detailed description of preferred forms of embodiment thereof, which description is given by way of non-limiting example, with reference to the appended drawings, in which.

DETAILED DESCRIPTION OF PARTICULAR EMBODIMENTS

Figure 1:
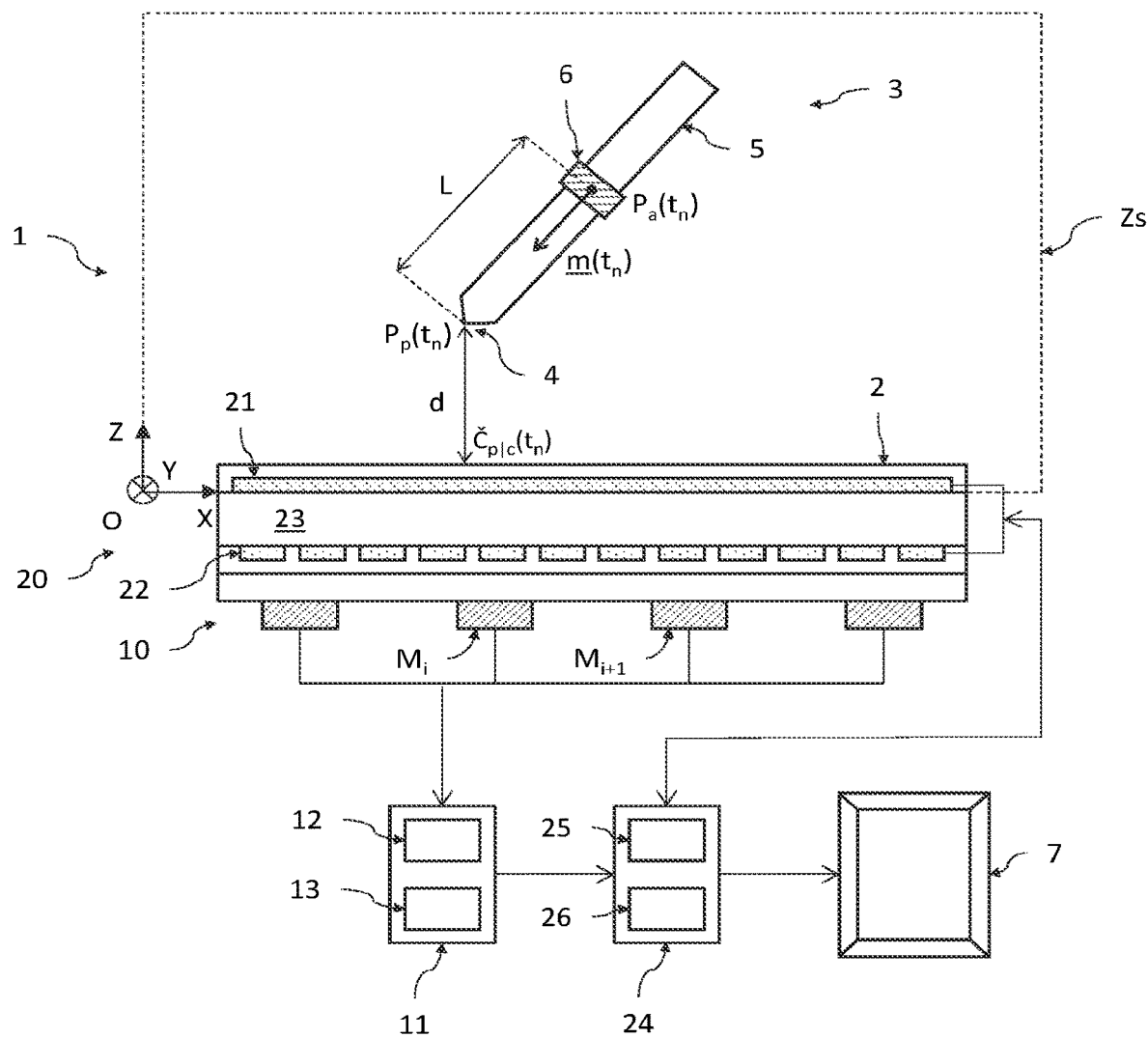
FIG. 1 is a schematic and partial cross-sectional view of a system for recording the track traced by the tip of a utensil over the writing surface according to one embodiment.

In the figures and in the rest of the description, the same references have been used to designate elements that are identical or similar. In addition, the various elements have not been shown to scale for the sake of clarity of the figures. Moreover, the various embodiments and variants are not mutually exclusive and may be combined together. Unless otherwise indicated, the terms "substantially", "about" and "of the order of" mean to within 10%, and preferably to within 5%. Moreover, the terms "comprised between . . . and . . . " and equivalents indicate that the limits are included, unless otherwise specified.

The invention relates to a system and method for recording the track traced by the tip of a utensil over a writing surface. The track-recording system comprises, generally:

- a utensil equipped with a magnetic object;
- a locating device, configured to determine the position $P_a$ of the magnetic object, and optionally its orientation, and to determine an estimated reference position $\hat{C}_{p|c}$ on the writing surface; and
- a matrix-array touch sensor, configured to detect the contact of the tip on the writing surface, and advantageously to measure the bearing force thereof.

The recording system may also comprise a graphical interface for displaying the track thus recorded. It is applicable to the digitization of a drawing or writing, or even to control of the graphical interface (for example selecting and moving a digital object displayed by the graphical interface, etc., etc.). By recording the track traced by the tip of the utensil, what is meant is determining and storing successive positions of the tip of the utensil when it is in contact with the writing surface. The track-recording system may thus detect the initial time of the first contact of the tip on the writing surface defining the start of the track, and the end time corresponding to breakage of contact and defining the end of the track.

The utensil is an object intended to be manipulated by a user, for example in his hand. It comprises a stiff structure (body) made of a preferably non-magnetic material, for example of plastic, which has a tip intended to make contact with the writing surface of the track-recording system. It may be a question of a pencil in the broadest sense, i.e. a pen, stylus, felt tip, brush or any other writing or drawing implement. The tip is one end of the utensil, and may be pointed or rounded, stiff or deformable.

The matrix-array touch sensor is said to be a 'touch' sensor in so far as it is suitable for detecting the contact of the tip of the utensil on the writing surface. In addition, it is said to be a 'matrix-array' sensor in so far as it comprises a matrix array of pixels that are distinct from one another formed by conductive tracks placed in rows and columns. Each pixel is configured to deliver an electrical response signal representative of contact if any of the tip of the utensil on the writing surface. The matrix-array touch sensor may be of capacitive or resistive type, and for example piezoresistive. More broadly, the matrix-array touch sensor has a parameter that varies locally depending on the contact of the tip on the writing surface, and optionally on the exerted bearing force. This parameter may be a capacitance, an electrical resistance, a voltage, etc.

Figure 2:
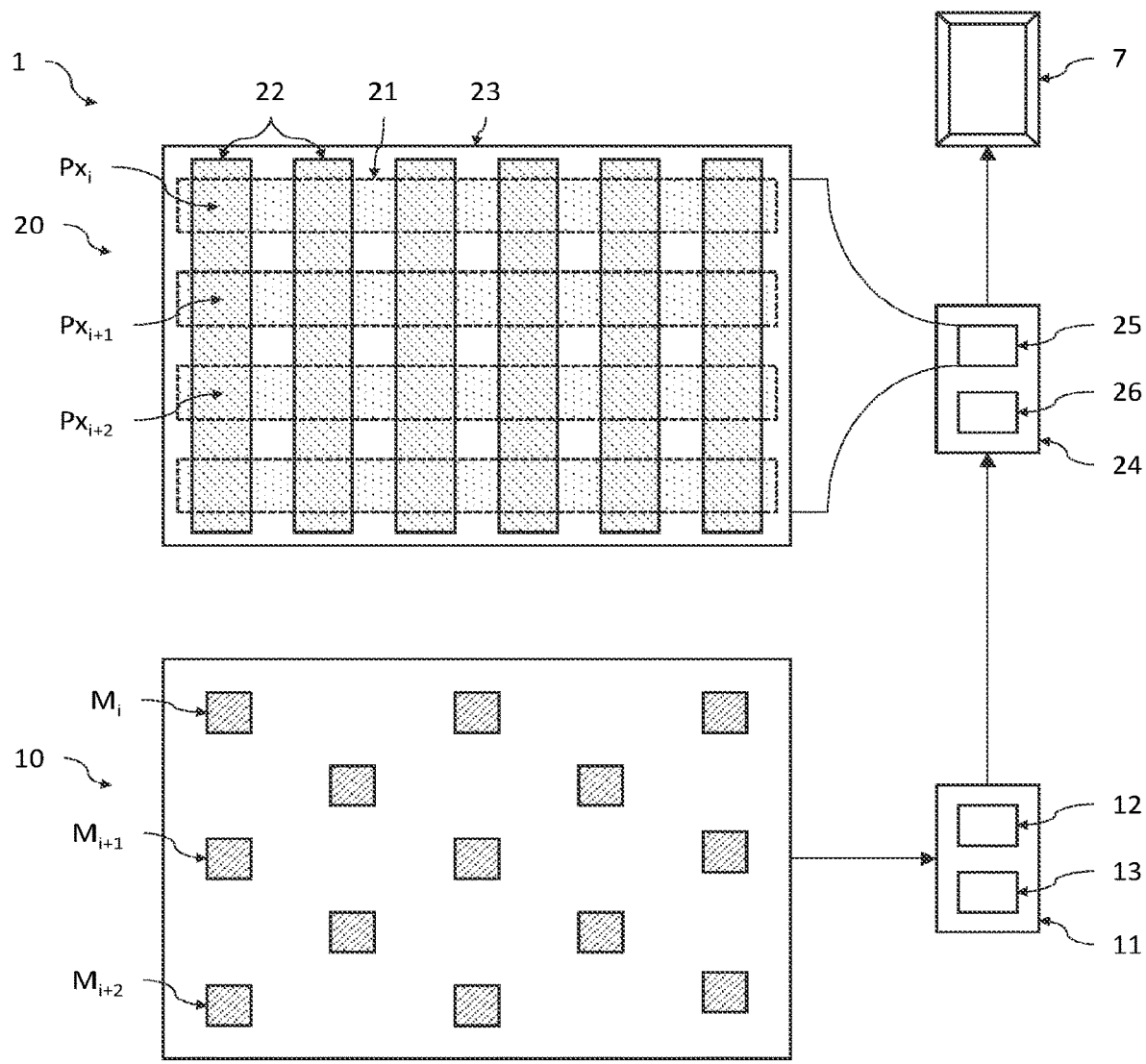
FIG. 2 is a schematic and partial exploded view of the track-recording system illustrated in FIG. 1.

FIGS. 1 and 2 are schematic and partial views in cross section and exploded, respectively, of a system 1 for recording the track of a utensil 3 according to one embodiment. In this example, the utensil 3 is a stylus the tip 4 of which is intended to make contact with the writing surface 2. Moreover, the matrix-array touch sensor 20 is a resistive matrix-array pressure sensor, which is then configured, in addition to detecting the contact of the tip 4 on the writing surface 2, to measure the bearing force (also called the pressing force) thereof.

The writing surface 2 may be the surface of a protective layer of the matrix-array touch sensor 20 described in detail below. It may also be the surface of an added element placed on a bearing surface of the matrix-array touch sensor 20, this element being configured to transmit the pressing force exerted by the tip 4 of the stylus 3 to the matrix-array touch sensor 20. Such an element may be, for example, one or more sheets of paper.

An orthogonal three-dimensional direct coordinate system OXYZ, in which the X- and Y-axes form a plane parallel to the writing surface 2, and in which the Z-axis is oriented toward the utensil 3, is defined here and will be referred to in the rest of the description. In this example, the origin O is located on the border of a tracking region Zs in which the magnetic object 6 is tracked, but it may be located elsewhere in the tracking region Zs, for example on the border of the writing surface 2.

The utensil 3 is equipped with a magnetic object 6, here a permanent magnet, which here is secured with no degree of freedom to the stiff structure 5 of the stylus 3. The magnetic object 6 comprises a material having a magnetization, a remanence for example, for which a magnetic moment m is defined. It may be a cylindrical permanent magnet, and for example an annular permanent magnet, such as illustrated in document WO2014/053526, or even an electromagnet. It may also be a transponder configured to re-emit a magnetic field emitted by an array of magnetic generators. However, in this example, the magnetic object 6 is a permanent magnet. In this example, the magnetic object 6 is distinct from the tip 4 and is located a non-zero distance L therefrom. As a variant, it may be none other than the tip 4.

The magnetic material is preferably ferrimagnetic or ferromagnetic. It has a non-zero spontaneous magnetic moment even in the absence of an exterior magnetic field. It may have a coercivity higher than 100 $A \cdot m^{-1}$ or 500 $A \cdot m^{-1}$ and the magnitude of the magnetic moment is preferably larger than 0.01 $A \cdot m^2$ or even than 0.1 $A \cdot m^2$, and for example equal to about 0.2 $A \cdot m^2$. It is considered that the magnetic object 6 may be approximated by a magnetic dipole, but other models may be used. The magnetic axis of the magnetic object 6 is defined as being the axis collinear with the magnetic moment m of the magnetic object 6. Preferably, the magnetic axis is directed toward the tip of the utensil.

As illustrated in FIG. 1, the magnet 6 may be placed at a non-zero distance L from the tip 4 of the stylus 3. This distance L is known and does not vary over time. It is defined in a digital model representative of the utensil 3 used, this model being stored in a memory 13 of the locating device 10. Thus, knowledge of the position and orientation of the magnet 6 in the coordinate system OXYZ allows the position $P_p$ of the tip 4 of the stylus 3 to be deduced. In the case where the magnet 6 and the tip 4 are one and the same, it is not necessary to determine the orientation of the magnetic moment m of the magnet 6.

The stylus 3 is intended to be manipulated by the user in a tracking region Zs. Initially, the stylus 3 does not make contact with the writing surface 2, and is distant therefrom by a non-zero value d that varies over time. Subsequently, the user brings the stylus 3 so that the tip 4 makes contact on the writing surface 2. The distance d is then zero and the matrix-array touch sensor 20 detects the contact and advantageously the pressing force exerted by the tip 4. Next, the user moves the tip 4 of the stylus 3 over the writing surface 2. The successive positions of the tip 4 in contact with the writing surface 2 form the track determined by the track-recording system 1.

The track-recording system 1 also comprises a locating device 10, configured to determine a state vector $X_a$ representative of the position of the magnet 6 in the coordinate system OXYZ, and optionally its orientation, then to determine at least one estimated reference position $\hat{C}_{p|c}$ on the writing surface 2. Thus, the locating device 10 determines, at various successive measurement times, an estimated reference position $\hat{C}_{p|c}$ on the writing surface 2, before or during the contact thereon. This estimated reference position $\hat{C}_{p|c}$ is preferably a projection along the Z-axis of the position $P_p$ of the tip 4 onto the XY-plane of the writing surface 2. It is said to be estimated in so far as it is determined by the locating device 10 and not by the matrix-array touch sensor 20.

By locate the magnet 6, what is meant is determine the position of the magnet 6 in the tracking region Zs in the form of a state vector $X_a$ and optionally its orientation. The position $P_a$ of the magnet 6 here corresponds to the coordinates of the geometric centre of the magnet 6, i.e. to the unweighted barycentre of all of the points of the magnet 6. Moreover, the magnetic moment m of the magnet 6 is a vector the components ($m_x$, $m_y$, $m_z$) of which are in the real coordinate system OXYZ. Its norm, also called its magnitude or amplitude, is denoted $\|m\|$ or m.

The magnet 6 is intended to be moved about in the tracking region Zs. The latter is a space in which the signal-to-noise ratio (SNR) of at least one of the magnetometers of the locating device 10 is higher than or equal to a predefined threshold value. By way of example, the tracking region Zs may be a space in which the signal, i.e. the norm or at least one component of the magnetic field generated by the magnet 6 and measured by the corresponding magnetometer, is greater than or equal to, for example, 20 times the noise. The noise associated with each magnetometer may be equal to about 0.2 µT. In this case, the tracking region Zs corresponds to a region of space in which the magnetic field generated by the magnet 6 and measured by at least one of the magnetometers $M_i$ is greater than or equal to about 6 µT, this corresponding to a distance $d_{max}$ equal to about 20 cm along the direction axis passing through the magnetometer $M_i$ in question. More simply, the tracking region Zs may be defined to be a space in which each point is at a distance smaller than or equal to a maximum distance $d_{max}$ along the direction axis passing through the closest magnetometer $M_i$, said distance for example being equal to 20 cm, or even to 10 cm, or indeed to 5 cm.

The locating device 10 is able to measure the ambient magnetic field, one of the contributions to which is the magnetic field generated by the magnet 6, at various measurement times, in a tracking period of duration T, in the coordinate system OXYZ, and then to estimate the position of the magnet 6, and optionally its orientation, on the basis of the measurements of the magnetometers $M_i$.

To do this, it comprises an array of magnetometers $M_i$ that are here secured with no degree of freedom to a back side of the matrix-array touch sensor 20. The number of magnetometers $M_i$ may, for example, be higher than or equal to 2, preferably higher than or equal to 16, and for example equal to about 25, notably when it is a question of triaxial magnetometers. The array of magnetometers $M_i$ however comprises at least three measurement axes that are distant from one another and not parallel pairwise. The magnetometers $M_i$ may be aligned in rows and columns, or may be mutually positioned in a substantially random manner. The positions of the magnetometers $M_i$ are known. For example, said positions may be comprised between 1 cm and 10 cm, and for example equal to 5 cm.

The magnetometers $M_i$ each have at least one measurement axis, and for example three measurement axes, denoted $x_i$, $y_i$, $z_i$. Each magnetometer therefore measures the amplitude and direction of the ambient magnetic field $B_i$ one contribution to which is generated by the magnet 6. More precisely, each magnetometer $M_i$ measures the norm of the orthogonal projection of the ambient magnetic field $B_i$ along the axes $x_i$, $y_i$, $z_i$ of the magnetometer. A calibration parameter of the magnetometers $M_i$ may be the noise associated with the magnetometers, which here is of the order of 0.2 µT. By ambient magnetic field B, what is meant is the magnetic field unperturbed by any magnetic element, and notably formed from a terrestrial contribution $B^{terr}$ of the order of 50 µT, on which the magnetic field $B^a$ generated by the magnet 6 is overlaid. Other magnetic contributions may also be overlaid, such as a contribution associated with the noise of the sensors and a contribution related to an offset error, which are neglected here.

The locating device 10 further comprises a computing unit 11 able to determine, on the basis of the measurements of the magnetometers $M_i$, the position of the magnet 6 in the coordinate system OXYZ and optionally its orientation, the position and where appropriate the orientation defining a state vector $X_a$. In addition, the computing unit 11 is able to determine the position $P_p$ of the tip 4 of the stylus 3 in the coordinate system OXYZ. The computing unit 11 is also configured to determine an estimated reference position $\hat{C}_{p|c}$ on the writing surface 2, and is connected to the processing unit 24 of the matrix-array touch sensor 20 with a view to transmitting thereto this estimated position $\hat{C}_{p|c}$. The computing unit 11 has the coordinates of the writing surface 2 in the coordinate system OXYZ. Thus, since it knows the position $P_p$ of the tip and the coordinates of the writing surface 2 in the coordinate system OXYZ, said unit is able to determine the estimated reference position $\hat{C}_{p|c}$ on the writing surface 2.

To this end, each magnetometer $M_i$ is electrically connected to the computing unit 11 by a data bus (not shown). The computing unit 11 comprises a programmable processor 12 able to execute instructions stored on a data-storage medium. It further comprises a memory 13 containing the instructions required to locate the magnet 6, and the digital model of the utensil 3 used, allowing the position $P_p$ of the tip 4 of the stylus 3 in the coordinate system OXYZ to be obtained on the basis of the state vector $X_a$. The memory 13 is also configured to store the information computed at each measurement time.

The computing unit 11 implements a mathematical model that associates the position of the magnet 6 in the coordinate system OXYZ, and, in this example, the orientation and magnitude of its magnetic moment m, with the measurements of the magnetometers $M_i$. This mathematical model is constructed on the basis of the equations of electromagnetism, and in particular of magnetostatics, and is notably parameterized by the positions and orientations of the magnetometers in the coordinate system OXYZ. Here, this model is non-linear. The computing unit 11 implements an algorithm to estimate its solution such as, for example, a Bayesian filter (e.g. an extended Kalman filter) or an optimization, or even any other algorithm of the same type.

Preferably, in order to be able to approximate the magnet 6 as a magnetic dipole, the distance between the magnet 6 and each magnetometer $M_i$ is larger than 2, or even 3 times the largest dimension of the magnet 6. This dimension may be smaller than 20 cm, or even smaller than 10 cm, or indeed than 5 cm. The magnet 6 may be modelled using a dipolar model, inter alia, notably depending on the distance between the magnet 6 and each magnetometer $M_i$ of the array.

The track-recording system 1 comprises a matrix-array touch sensor 20, here a matrix-array pressure sensor. It is configured to detect the contact of the tip 4 of the stylus 3 on the writing surface 2 on the basis here of measurement of the magnitude of the pressing force exerted on this writing surface 2.

The matrix-array pressure sensor comprises a pressure-detecting matrix array, formed from a plurality of pixels $Px_i$ that are sensitive to the pressure exerted on its surface. The pressure-detecting matrix array is in this example of resistive type. Such a sensor is also called a force-sensing resistor.

It is formed from a film 23 made of a piezoresistive material, i.e. of a material the local electrical resistance of which varies depending on the exerted mechanical stress, of a conductive polymer for example. The sensitive material of the film may be continuous in the XY-plane or may be pixelated. Conductive tracks 21, 22 are formed in rows on one side of the film 23 and in columns on the opposite side. The pixels $Px_i$ are formed by the intersection, seen from above, between the rows and columns of the conductive tracks 21, 22. The pixels $Px_i$ may adjoin one another, or be spaced apart from one another (as illustrated in FIG. 2).

The matrix-array pressure sensor 20 comprises a number N of pixels $Px_i$, for example equal to about 2500. The conductive tracks 21, 22 may have a width of a few millimetres, 2.5 mm for example, and hence one pixel here has an area of 2.5×2.5 mm². The pixels $Px_i$ are distinct and spaced apart in the XY-plane from one another for example by a distance of about 1 mm. The diameter of the tip 4 of the stylus 3 that makes contact with the writing surface 2 may here be of the order of 1 mm, and for example comprised between about 1 mm and 3 mm.

The matrix-array pressure sensor 20 comprises a processing unit 24, comprising a microcontroller 25 that commands and reads out the various pixels of the pressure-detecting matrix array, and a computing unit 26 configured to detect the contact of the tip 4 and to determine the magnitude of the exerted pressing force, on the basis of the electrical response signals generated by the pixels. The microcontroller 25 is thus configured to transmit an electrical command signal to each of the pixels, and to receive an electrical response signal, the latter being representative of any contact of the tip 4 of the stylus 3 on the writing surface 2, and, furthermore, here, of the magnitude of the pressing force exerted by the stylus 3. The processing unit 21 has the coordinates of the N pixels $Px_i$ in the coordinate system OXYZ. Thus, since it knows the estimated reference position $\hat{C}_{p|c}$ on the writing surface 2 and the coordinates of the N pixels $Px_i$ in the coordinate system OXYZ, said unit is able to determine a set $S_{px}$ of M pixels, with M lower than N, that at least partially encircle the estimated reference position $\hat{C}_{p|c}$. M is preferably higher than or equal to 2.

The computing unit 26, on the basis of the received electrical response signals, detects whether there is a contact or not of the tip 4 on the writing surface 2. To this end, the electrical signal generated by each pixel has a magnitude that, when it is higher than a predetermined threshold, corresponds to contact of the tip 4 on the writing surface 2. The amplitude of the electrical signals generated by one or more pixels is dependent on the magnitude of the pressing force exerted by the tip 4.

The processing unit 24 then stores the successive estimated reference positions $\hat{C}_{p|c}(t_n)$ on the writing surface 2 determined by the locating device 10, when contact has been detected, which thus form or participate in forming the track of the utensil 3 over the writing surface 2. The magnitude of the exerted pressing force allows an additional characteristic of the track of the utensil 3 to be quantified, and may be used to make for example the width of the track of the utensil 3 vary. The processing unit 24 may be connected to a graphical interface 7, with a view for example to displaying the track recorded by the system.

The processing unit 24 may thus comprise a microcontroller 25 for controlling the supply of electrical power to the pixels, which are associated with analogue-digital converters ADCs, and its computing unit 26 comprises at least one processor and at least one memory containing the instructions required to implement the detection of the contact of the tip 4 and the measurement of the pressing force, and to store the information computed at each measurement time, and here converters. Of course, the processor and the memory of the computing unit 26 may be common or not with those of the microcontroller 25.

According to the invention, the processing unit 24 of the matrix-array touch sensor 20 is connected to the computing unit 11 of the locating device 10, and receives from the latter the successive estimated reference positions $\hat{C}_{p|c}(t_n)$ on the writing surface 2, whether there is contact of the tip 4 on the writing surface 2 or not.

Preferably, it receives these data only when the position $P_{p,z}$ of the tip 4 along the Z-axis is less than or equal to a predetermined threshold value $P_{p,z,th}$. When this is not the case, the matrix-array touch sensor 20 may be inactive, i.e. completely or partially turned off, so as to limit the power consumption of the track-recording system 1.

When the position $P_{p,z}$ is less than or equal to the threshold value $P_{p,z,th}$, the processing unit 24 is activated (turned on), receives the value of the estimated reference position $\hat{C}_{p|c}$ on the writing surface 2, and determines a set $S_{px}$ of M pixels, with M lower than N, that at least partially encircle the estimated reference position $\hat{C}_{p|c}$. By way of example, the total number N of pixels may be equal to about 2500, and the number M of pixels of said set $S_{px}$ may be equal to about 25, a square of 5×5 pixels for example.

The processing unit 24 then performs measurement only for the pixels of said set $S_{px}$ and not for all the pixels of the matrix array. Electrical command signals are therefore transmitted only to the M pixels, the other pixels remaining turned off. Next, electrical response signals are received by the processing unit 24. Thus, pixel command/readout latency is greatly decreased, in so far as it is here a question of reading 25 pixels at each measurement time, and not 2500 pixels. Consequently, power consumption is also greatly decreased.

Lastly, the processing unit 24 is configured to determine the track traced by the stylus 3 on the basis of the successive estimated reference positions $\hat{C}_{p|c}$ on the writing surface 2, and here on the basis of the value of the exerted pressing force, then to command the graphical interface 7 to display the determined track. As detailed below, the track may be formed by all of the successive estimated positions $\hat{C}_{p|c}$, but it may also take into account successive positions $C_{p|c}$, of the contact, determined by the matrix-array touch sensor 20. The precision of the measurement of the contact may then be improved.

Thus, the track-recording system 1, because of the combination of the device 10 for locating the magnetic object 6 and the matrix-array touch sensor 20, has a number of advantages. It is thus possible to use a high number of commercially available utensils, provided that the utensil in question allows the magnetic object 6, such as a magnet, to be fastened thereto. The utensil 3 may moreover be equipped with only a single magnet 6 to be located. It is therefore not necessary for it to be equipped with a plurality of magnets, even though it is possible to provide a plurality of magnets secured to the utensil. Thus, the need to use a dedicated and complex utensil 3, as in document EP2811383, is avoided. It is in addition no longer necessary to integrate a pressure sensor into the utensil.

Moreover, the contact of the tip 4 is detected with precision by the matrix-array touch sensor 20, and the position of the tip 4 on the writing surface 2 is determined with a high resolution by the locating device 10. Detection of the position of the tip 4 is thus not impacted by the potentially low resolution of conventional matrix-array touch sensors, which depends on the dimensions and on the arrangement of the conductive tracks 21, 22. In addition, the determination of the estimated reference position $\hat{C}_{p|c}$ on the writing surface 2 is not disrupted by any parasitic contacts, such as contact of the finger or contact of the palm of the hand of the user on the writing surface 2.

Moreover, the track-recording system 1 has a latency related to command/readout of the matrix array of pixels that is particularly low, in so far as only the M selected pixels of the set $S_{px}$ are activated by the microcontroller 25, and not the N pixels of the matrix array. The command/readout frequency may thus be particularly high. Therefore, the power consumption of the track-recording system 1 is decreased. In addition, it is advantageous that the matrix-array touch sensor 20 remains at least partially inactive while the magnetic object 6 is being tracked by the locating device 10, and notably when the position $P_{p,z}$ of the tip 4 along the Z-axis is greater than the threshold value $P_{p,z,th}$.

Moreover, it is possible to use a matrix-array touch sensor 20 the microcontroller 25 of which and the electrical connections of which are simple and conventional. The need to use a particular microcontroller 25 and particular connections tied to the need to activate rows and/or columns individually and sequentially, or all together, such as described in document WO2013/057412, is thus avoided.

Figure 3:
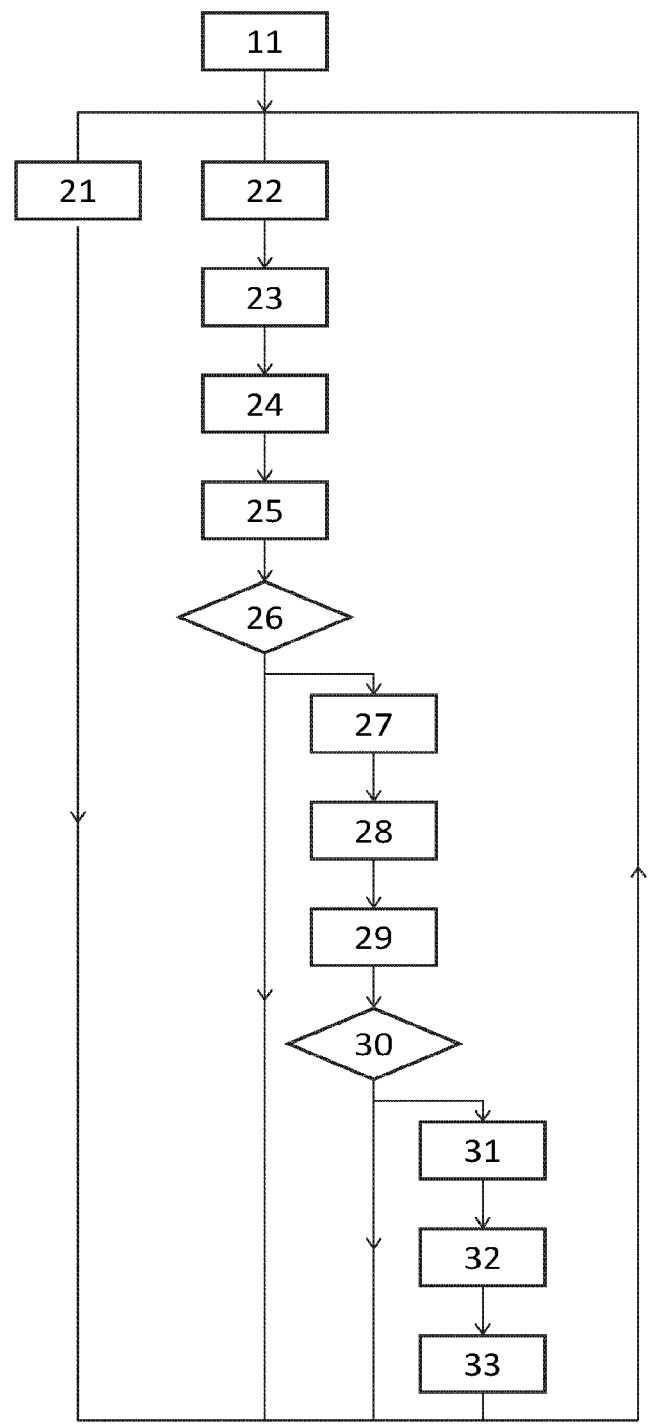
FIG. 3 is a flowchart illustrating steps of a method for recording the track traced by the tip of a utensil over the writing surface, according to one embodiment.

FIG. 3 is a flowchart illustrating a method for recording the track of the utensil 3 according to one embodiment. In this example, the track-recording system 1 is identical to that described with reference to FIGS. 1 and 2. It commands the graphical interface 7 to display the track thus recorded.

In a first step 11, a digital model of the stylus 3 is stored in the memory 13 of the computing unit 11 of the locating device 10. As mentioned above, this digital model allows the position $P_p$ of the tip 4 in the coordinate system OXYZ to be deduced on the basis of the state vector $X_a$ of the magnet 6. This step 11 may also comprise a phase of storing coordinates in the coordinate system OXYZ of the writing surface 2, and a phase of storing coordinates in the coordinate system OXYZ of the N pixels $Px_i$ of the matrix-array touch sensor 20.

In a step 21, the user manipulates the stylus 3 in the tracking region Zs, i.e. he modifies the position thereof and optionally its orientation in the coordinate system OXYZ. Initially, the tip 4 of the stylus 3 does not make contact with the writing surface 2 and has a position $P_{p,z}$, along the Z-axis, greater than the threshold value $P_{p,z,th}$. Subsequently, the tip 4 has a position $P_{p,z}$ less than or equal to the threshold value $P_{p,z,th}$ but still not in contact with the writing surface 2. Finally, thereafter, it makes contact with the writing surface 2 and the position of the tip 4 on the writing surface 2 is stored and forms the recorded and displayed track.

Steps 22 to 33 are carried out iteratively at measurement times $t_n$, time being discretized at a determined sampling frequency, 140 Hz for example. With each iteration of rank n is associated one measurement time $t_n$, which is also called the current time.

In a step 22, the magnetometers measure the ambient magnetic field at the current time, and notably the contribution, to the ambient magnetic field, generated by the magnet 6 secured to the stylus 3.

In a step 23, the computing unit 11 receives the measurements of the ambient magnetic field, deduces therefrom the magnetic-field contribution generated by the magnet 6, and determines the state vector $X_a(t_n)$ associated with the magnet 6 at the current time $t_n$ in the coordinate system OXYZ. The state vector $X_a(t_n)$ comprises the position of the magnet 6 in the coordinate system OXYZ, and also, in this example, its orientation. This estimation of the state vector may be made using an algorithm for estimating the position and the orientation of the magnet 6 of Bayesian type, for example an extended Kalman filter, or using an optimization method (gradient descent, etc.), or using any other algorithm of the same type. An example of estimation of a state vector associated with a magnet 6 is notably described in patent application WO2018/219891.

In a step 24, the computing unit 11 determines the position $P_p(t_n)$ of the tip 4 of the stylus 3, on the basis of the state vector $X_a(t_n)$ and of the digital model of the stylus 3. The position $P_p(t_n)$ of the tip 4 comprises the component $P_{p,z}(t_n)$ along the Z-axis and the component $P_{p,xy}(t_n)$ in the XY-plane parallel to the writing surface 2. In the case where the magnetic object 6 is none other than the tip 4, the position $P_p(t_n)$ of the tip 4 is identical to the position $P_a(t_n)$.

In a step 25, the computing unit 11 determines the estimated reference position $\hat{C}_{p|c}(t_n)$ on the writing surface 2, on the basis of the state vector $X_a(t_n)$ and of the coordinates of the writing surface 2 in the coordinate system OXYZ. This estimated reference position $\hat{C}_{p|c}$ may be equal to the projection along the Z-axis of the position $P_{p,xy}(t_n)$ of the tip 4 in the XY-plane, in which case $\hat{C}_{p|c}(t_n)$ and $P_{p,xy}(t_n)$ are equal.

In a step 26, the value of the position $P_{p,z}(t_n)$ of the tip 4 along the Z-axis is compared to the predefined threshold value $P_{p,z,th}$. When the position $P_{p,z}(t_n)$ is greater than the threshold value $P_{p,z,th}$, the locating device 10 continues to measure the magnetic field (steps 22 and after). The matrix-array touch sensor 20 advantageously remains deactivated, i.e. it is not turned on electrically, so as to limit the power consumption of the track-recording system 1. If the locating device 10 is directly connected to the graphical interface 7, the tip 4 may be represented and displayed on the graphical interface 7, without display of a track. When the position $P_{p,z}(t_n)$ is less than or equal to the threshold value $P_{p,z,th}$, the method continues with step 27.

Figure 4A:
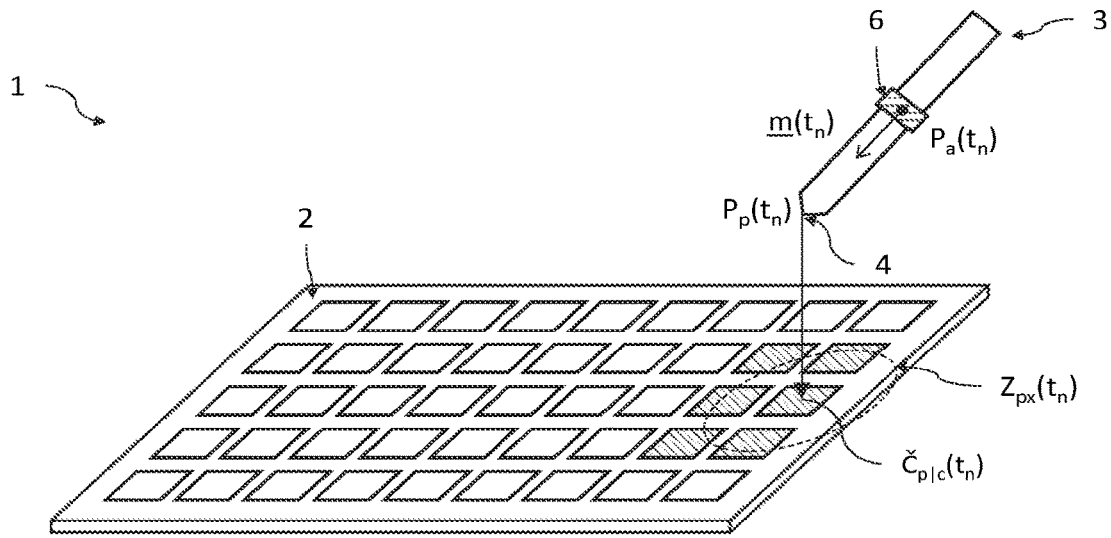
FIGS. 4A and 4B are schematic and partial perspective views of a track-recording system according to one embodiment, at two different measurement times.
Figure 4B:
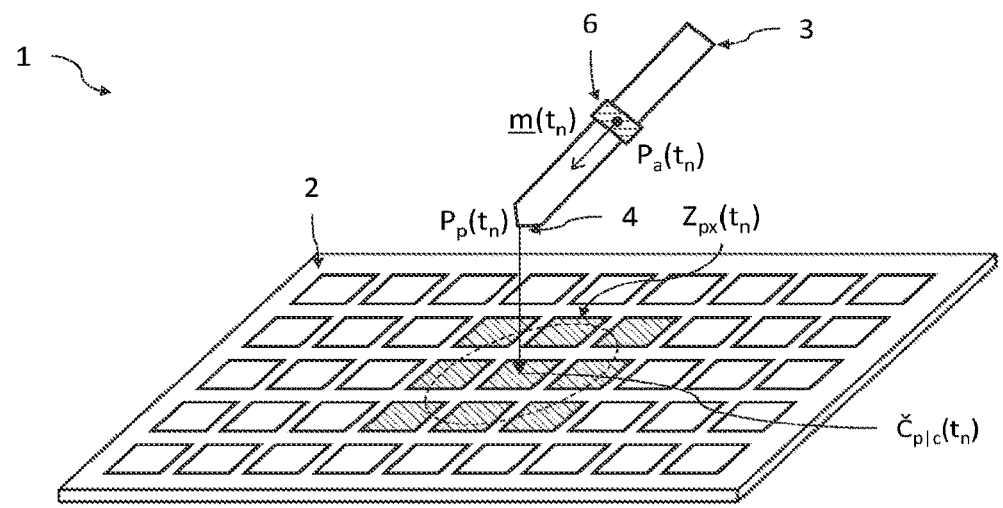

In a step 27, the matrix-array touch sensor 20 is activated (where appropriate), and the value of the estimated reference position $\hat{C}_{p|c}(t_n)$ on the writing device 2 is transmitted to the processing unit 24 of the matrix-array touch sensor 20. The latter then determines a set $S_{px}(t_n)$ of pixels of the pressure-detecting matrix array that at least partially encircle the estimated reference position $\hat{C}_{p|c}(t_n)$. To this end, the coordinates of each pixel $Px_i$ in the coordinate system OXYZ are stored in the memory of the processing unit 24. The processing unit 24 determines a pixel-selection region $Z_{px}(t_n)$, which region is centred on the estimated reference position $\hat{C}_{p|c}(t_n)$ and has a predefined outline, for example a circle, oval, square, rectangle, etc. In this regard, FIGS. 4A and 4B illustrate the track-recording system 1 at two different measurement times, and show the region $Z_{px}(t_n)$ centred on the estimated reference position $\hat{C}_{p|c}(t_n)$. In this example, the set $S_{px}(t_n)$ comprises pixels the area of which is at least partially located inside this pixel-selection region $Z_{px}(t_n)$. This set $S_{px}(t_n)$ is redefined at each measurement time $t_n$.

Moreover, the matrix-array touch sensor 20 may have been initialized by measuring the "background noise" associated with the matrix array of pixels in the absence of any contact (tip of the stylus, finger, palm, etc.) on the writing surface 2. This initial measurement is then systematically subtracted from the measurements of the electrical response signals of the pixels of the set $S_{px}(t_n)$, thus allowing any drift as a function of time and/or offset errors to be removed.

In a step 28, the microcontroller 25 of the processing unit 24 activates only the M pixels of the set $S_{px}(t_n)$, and keeps inactive the other pixels, which are not selected (i.e. not turned on electrically). It therefore transmits an electrical command signal to the pixels of the set $S_{px}(t_n)$ and receives their electrical response signals.

In a step 29, the processing unit 24 determines the value of a parameter $\kappa(t_n)$ representative of the contact of the tip 4 on the writing surface 2. This parameter may be the amplitude of the electrical response signal of at least one of the pixels of the set $S_{px}(t_n)$, or even the, optionally weighted, average of the amplitude of the electrical response signals of the pixels of the set $S_{px}(t_n)$. It may be a question of the electrical resistance of at least one of the pixels of the set $S_{px}(t_n)$, or any other equivalent parameter.

In a step 30, the processing unit 24 compares the value of the parameter $\kappa(t_n)$ to a predefined threshold value $\kappa_{th}$ and detects that the tip 4 is actually making contact with the writing surface 2 when the value of the parameter $\kappa(t_n)$ is higher than or equal to the threshold value $\kappa_{th}$. The threshold value $\kappa_{th}$ allows fluctuations related to the measurement noise to be filtered out. When this is not the case, the track-recording method continues with the measurement of the magnetic field (steps 22 and after), and when contact is detected, the method continues with step 31.

In a step 31, provided that contact of the tip 4 on the writing surface 2 is detected by the matrix-array touch sensor 20, the processing unit 24 stores the estimated reference position $\hat{C}_{p|c}(t_n)$ delivered by the locating device 10. The successive estimated reference positions $\hat{C}_{p|c}(t_n)$ stored by the processing unit 24 form or participate in forming the record of the track traced by the stylus 3.

As a variant, the position of the tip 4 in contact with the writing surface 2, such as stored by the processing unit 24, may depend both on the estimated reference position $\hat{C}_{p|c}(t_n)$ delivered by the locating device 10, and on a position $C_{p|c}(t_n)$ delivered by the matrix-array touch sensor 20. Thus, the position $C_{p|c}(t_n)$ may correspond to the position of the centroid (weighted barycentre) of the pressing forces exerted by the tip 4 on the writing surface 2 and measured by the pixels of the set $S_{px}(t_n)$. The position of the tip 4 stored by the processing unit 24 may be the, optionally weighted, average of the positions $\hat{C}_{p|c}(t_n)$ and $C_{p|c}(t_n)$.

In a step 32, when the matrix-array touch sensor 20 is configured to measure the pressing force, i.e. when it comprises a pressure-detecting matrix array, the processing unit 24 measures the pressing force applied by the tip 4 to the writing surface 2. The pressing force is determined on the basis of the amplitude of the electrical response signals generated by the pixels of the set $S_{px}(t_n)$ in a known way. The pressing force, at the current time $t_n$, for example allows a characteristic of the track, for example the width of the track displayed on the graphical interface 7, to be modified.

In a step 33, the processing unit 24 constructs the track on the basis of the successive stored positions of the tip 4, and here taking into account the pressing force applied by the tip 4 to the writing surface 2. It then commands the display of the track thus recorded on the graphical interface 7.

Steps 22 to 33 are reiterated at the defined sampling frequency, which may or may not remain constant over time, and which may notably depend on the velocity of the magnet 6 or of the tip 4, which is computed by the locating device 10 on the basis of the state vector $X_a(t_n)$. In particular, the sampling frequency associated with the location of the magnet 6 (for example 140 Hz) may be identical to or different from the frequency at which the pixels of the set $S_{px}(t_n)$ are commanded/read out.

FIGS. 4A and 4B are perspective views of the utensil 3 manipulated by a user above the writing surface 2 of the matrix-array touch sensor 20, at two different times.

In these two examples, the tip 4 has a position $P_{p,z}(t_n)$ of the tip 4 along the Z-axis less than the threshold value $P_{p,z,th}$, and hence the matrix-array touch sensor 20 is activated and the estimated reference position $\hat{C}_{p|c}(t_n)$ on the writing surface 2 is transmitted thereto. It then determines a selection region $Z_{px}(t_n)$ of circle shape centred on the value $\hat{C}_{p|c}(t_n)$.

In the example of FIG. 4A, the stylus 3 is positioned on the border of the writing surface 2. The selection region $Z_{px}(t_n)$ then straddles on and off the writing surface 2. One pixel is entirely located in the selection region $Z_{px}(t_n)$, and is encircled by 5 adjacent pixels partially located in the selection region $Z_{px}(t_n)$. Thus, the set comprises the 6 pixels located at least partially in the selection region $Z_{px}(t_n)$. The selected pixels thus at least partially encircle the estimated reference position $\hat{C}_{p|c}(t_n)$ on the writing surface 2.

In the example of FIG. 4B, the stylus 3 is positioned at the centre of the writing surface 2. The selection region $Z_{px}(t_n)$ then lies entirely on the writing surface 2. In this example, a single pixel is entirely located in the selection region $Z_{px}(t_n)$, and is encircled by 8 adjacent pixels located partially in the selection region. Thus, the set $S_{px}$ comprises the 9 pixels located at least partially in the selection region $Z_{px}(t_n)$. The selected pixels thus at least partially encircle the estimated reference position $\hat{C}_{p|c}$ on the writing surface 2.

Of course, the selection region $Z_{px}(t_n)$ may have other shapes. By way of example, it may have an elongate shape, the major axis then being oriented in the direction of movement of the tip 4, which is determined by the locating device 10 on the basis of the state vector $X_a(t_n)$. The dimension of the major axis may also depend on the velocity of the tip or of the magnet, this velocity being determined by the computing unit 11 on the basis of the state vector $X_a$ estimated at a plurality of measurement times, and being transmitted to the processing unit 24. Moreover, the shape and/or size of the selection region $Z_{px}(t_n)$ may depend on the type of utensil 3 used, and optionally on the characteristics of the tip 4.

Particular embodiments have just been described. Various variants and modifications will appear obvious to anyone skilled in the art.

Thus, the track-recording system 1 may comprise a plurality of utensils 3 each equipped with at least one magnetic object 6 and intended to make contact with the same writing surface 2. The locating device 10 may thus determine a state vector for each of the magnetic objects 6, and the matrix-array touch sensor 20 may determine the contact of the tip 4 of each of the utensils 3.

The invention claimed is:

1. A system for recording a track traced over a writing surface, the system comprising:
    a utensil, configured to be manipulated by a user, equipped with a magnetic object, and comprising a tip configured to make contact with the writing surface to form the track to be recorded;
    a locating device, including:
        an array of magnetometers, which are secured to the writing surface, and configured to measure a magnetic field emitted by the magnetic object at various successive measurement times $t_n$, and
        electronic computing circuitry, configured to determine a state vector $X_a$ representative of at least a position of the magnetic object based on the measured magnetic field, and to determine an estimated reference position $\hat{C}_{p|c}$ on the writing surface based on the state vector $X_a$, and
    a matrix-array touch sensor comprising:
        a matrix array of N distinct pixels, which are secured to the writing surface, and each configured to deliver an electrical response signal representative of a contact of the tip on the writing surface; and
        electronic processing circuitry, connected to the electronic computing circuitry, and configured to determine a set $S_{px}$ of M pixels, with M less than N, at least partially encircling said estimated reference position $\hat{C}_{p|c}$, transmit an electrical command signal to the M pixels of said set $S_{px}$ and receive the electrical response signals, detect the contact of the tip on the writing surface based on the electrical response signals generated by said set $S_{px}$ of M pixels, and when contact is detected, store successive positions of the tip to form the record of the track at least depending on the successive estimated reference positions $\hat{C}_{p|c}$.

2. The system according to claim 1, wherein the locating device is further configured to determine a position $P_{p,z}$ of the tip along an axis orthogonal to the writing surface based on the state vector $X_a$, compare the determined position $P_{p,z}$ with a predefined threshold value $P_{p,z,th}$, and transmit the estimated reference position $\hat{C}_{p|c}$ to the matrix-array touch sensor when the position $P_{p,z}$ is less than or equal to the predefined threshold value $P_{p,z,th}$.

3. The system according to claim 1, wherein the locating device is further configured to determine a position $P_{p,z}$ of the tip along an axis orthogonal to the writing surface based on the state vector $X_a$, compare the determined position $P_{p,z}$ with a predefined threshold value $P_{p,z,th}$, and activate the matrix-array touch sensor when the position $P_{p,z}$ is less than or equal to the predefined threshold value $P_{p,z,th}$, the matrix-arrayed touch sensor remaining turned off otherwise.

4. The system according to claim 1, wherein the estimated reference position $\hat{C}_{p|c}$ is determined by projecting, along an axis orthogonal to the writing surface, the position $P_{p,xy}$ of the tip in a plane parallel to the writing surface.

5. The system according to claim 1, wherein the locating device is further configured to compute a velocity of the magnetic object based on the state vector $X_a$ determined at a plurality of measurement times and transmit the velocity to the electronic processing circuitry, the electronic processing circuitry being configured to define the set $S_{px}$ of M pixels with an outline elongate along a major axis, the major axis being parallel to the axis of the velocity.

6. The system according to claim 5, wherein the major axis has a length that depends on the norm of the velocity.

7. The system according to claim 1, wherein the matrix-array touch sensor is a matrix-array pressure sensor configured to determine a pressing force exerted by the tip on the writing surface.

8. The system according to claim 7, wherein the matrix-array touch sensor is further configured to determine a position $C_{p|c}$ of the point of contact of the tip on the writing surface, the position of the tip stored to form the track depending on the reference estimated position $\hat{C}_{p|c}$ and on the position $C_{p|c}$ of the point of contact of the tip.

9. The system according to claim 1, wherein the state vector $X_a$ is determined by a Bayesian-estimation algorithm or using an optimization method.

10. A method for recording a track of the tip of the utensil over the writing surface by means of the system according to claim 1, the method comprising:
- manipulating, by a user, of the utensil, the utensil initially not making contact with the writing surface then being brought into contact with the writing surface;
- measuring the magnetic field emitted by the magnetic object at various successive measurement times $t_n$, by the matrix array of magnetometers;
- determining the state vector $X_a(t_n)$ of the magnetic object, by the electronic computing circuitry, based on the measurements of the measured magnetic field; and
- determining the estimated reference position $\hat{C}_{p|c}(t_n)$ on the writing surface, by the electronic computing circuitry, based on the determined state vector $X_a(t_n)$, the method further including
- determining the set $S_{px}(t_n)$ of M pixels ($Px_i$) at least partially encircling the estimated reference position $\hat{C}_{p|c}(t_n)$, by the electronic processing circuitry;
- transmitting the electrical command signal, by the electronic processing circuitry, to the pixels of the set $S_{px}(t_n)$ and receiving electrical response signals;
- detecting the contact of the tip on the writing surface, by the electronic processing circuitry, based on the electrical response signals generated by said set $S_{px}$ of M pixels, and when contact is detected, storing successive positions of the tip to form the record of the track at least depending on the successive estimated reference positions $\hat{C}_{p|c}(t_n)$.

11. A non-transitory computer-readable medium storing instructions for executing a method for recording a track according to claim 10, when the instructions are executed by processing circuitry.

* * * * *